United States Patent
Kuo et al.

(10) Patent No.: US 6,844,516 B1
(45) Date of Patent: Jan. 18, 2005

(54) WIRE CUT ELECTRIC DISCHARGE MACHINE WITH ROLLERS

(75) Inventors: Chia-Lung Kuo, 6 F, No. 207, Lane 125, Sec. 3, Dasyue Road, Douliou City, Yunlin County (TW); Zhi-Kai Xu, Taichung (TW); Yao-Fan Su, Taoyuan (TW); June-Chin Wang, No. 91, Sanmin Road, Cyonglin Township, Hsinchu County (TW)

(73) Assignees: Taiwan Micro System Co., Ltd., Taipei (TW); Chia-Lung Kuo, Yunlin (TW); June-Chin Wang, Hsinchu (TW)

( * ) Notice: Subject to any disclaimer, the term of this patent is extended or adjusted under 35 U.S.C. 154(b) by 0 days.

(21) Appl. No.: 10/760,421

(22) Filed: Jan. 21, 2004

(51) Int. Cl.[7] .............................. B23H 7/02; B23H 7/10
(52) U.S. Cl. ...................................... 219/69.12; 72/224
(58) Field of Search ......................... 219/69.12; 72/224

(56) References Cited

U.S. PATENT DOCUMENTS 4,766,280 A * 8/1988 Groos ..................... 219/69.12
6,216,513 B1 * 4/2001 Nakamura et al. ............ 72/148
6,737,602 B2 * 5/2004 Stelter ...................... 219/69.12

FOREIGN PATENT DOCUMENTS

JP          1-222823 A  *  9/1989

* cited by examiner

Primary Examiner—Geoffrey S. Evans
(74) Attorney, Agent, or Firm—Rosenberg, Klein & Lee

(57) ABSTRACT

A wire cut electric discharge machine having rollers is disclosed. It has a wire electrode disposed in a working zone of the electric discharge machine. This wire electrode is rolled by a rolling device so that the cross-sectional area of this wire electrode changes from a circular area into an elongated one. After rolled, the wire electrode has two parallel rolled flat surfaces. The working width between these flat surfaces is smaller than the original diameter of the wire electrode before rolled. So, the cutting width is narrower than before. By using the rolled wire electrode, this invention can reduce the cutting width limit. I can improve the precision of the product, without changing the material property of the wire electrode. And, it can reduce the cost of the wire electrode.

1 Claim, 5 Drawing Sheets

WIRE CUT ELECTRIC DISCHARGE MACHINE WITH ROLLERS

BACKGROUND OF INVENTION

1. Field of the Invention

The present invention relates to a wire cut electric discharge machine, particularly to a wire cut electric discharge machine with rollers. By using the rolled wire electrode, this invention can reduce the cutting width limit. It can improve the precision of the product, without changing the original material property of the wire electrode. And, it can reduce the cost of the wire electrode.

2. Description of the Prior Art

As shown in FIGS. 8 to 11, the traditional wire cut electric discharge machine comprises a machine 80 and a wire electrode 84.

The machine 80 has a feeding portion 81 and a receiving portion 82. There is a working zone 83 between the feeding portion 81 and the receiving portion 82.

The wire electrode 84 is disposed in the working zone 83. It is constantly fed from the feeding portion 81 and enters into the receiving portion 82. This wire electrode 84 has a circular cross-sectional area that has a predetermined diameter. By using this wire electrode 84, it can cut a workpiece (not shown) by the traditional electric discharge machining method.

However, the disadvantages can be summarized as follows:

[1] It cannot break through the current cutting width limit. The smallest size (which means its diameter) of the current cheaper cupper made wire electrode is roughly 50 $\mu$m. But, due to the rapidly growing microstructure industry, the current cutting width limit needs to be broken.

[2] The reduction for diameter is limited by its material property. If the user just simply reduces the diameter of wire electrode, this wire electrode will be easily broken by a pulling force (during the feeding process) or will be melt out due to high temperature (caused by the electric discharge heat). So, the diameter cannot be simply reduced under its material property requirement (such as its tensile strength limit, melting point, etc.). Currently, the minimum diameter of the copper made wire electrode is approximately 50 $\mu$m.

[3] The cost of 30-$\mu$m wire electrode is high. Concerning the microstructure machining, the tungsten made wire electrode with 30 $\mu$m is the most popular one (almost one half of the diameter of the copper made one, 50 $\mu$m). But, the major disadvantage is too expensive. Particularly, it is not suitable for mass production. Besides, except the diameter 30 $\mu$m, there must be certain gaps (roughly 5 $\mu$m each) on both sides. As a result, the minimum cutting width should be roughly 40 $\mu$m (30+5+5). That is, if a width of slot is less than 40 $\mu$m, it cannot be cut by any existing wire electrode.

SUMMARY OF THE INVENTION

The primary object of the present invention is to provide a wire cut electric discharge machine having rollers. It can reduce the cutting width limit so that the precision of the microstructure product is enhanced.

The next object of the present invention is to provide a wire cut electric discharge machine having rollers. In which, the original material property and the total area of its cross-sectional area of the wire electrode will remain unchanged.

Another object of the present invention is to provide a wire cut electric discharge machine having rollers. It can reduce the cost of the wire electrode.

In order to achieve above-mentioned objects, the present invention is provided as a technical solution. A wire cut electric discharge machine having rollers comprises:

a machine having an upper surface and a lower surface;

a feeding portion disposed on said upper surface, said feed portion having a downward surface;

a receiving portion disposed on said lower surface;

a working zone between said feeding portion and said receiving portion;

a wire electrode having two ends and an outer periphery;

a rolling device mounted beneath said lower surface of said machine, said rolling device having a pair of rollers, the rollers being spaced by an adjustable working distance;

said feeding wire electrode being rolled by said rollers from a cylindrical structure having a diameter into a thin piece-like structure having two substantially parallel surfaces, a working width between said two parallel surfaces being smaller than said diameter.

DETAILED DESCRIPTION OF THE PREFERRED EMBODIMENT

Figure 1:
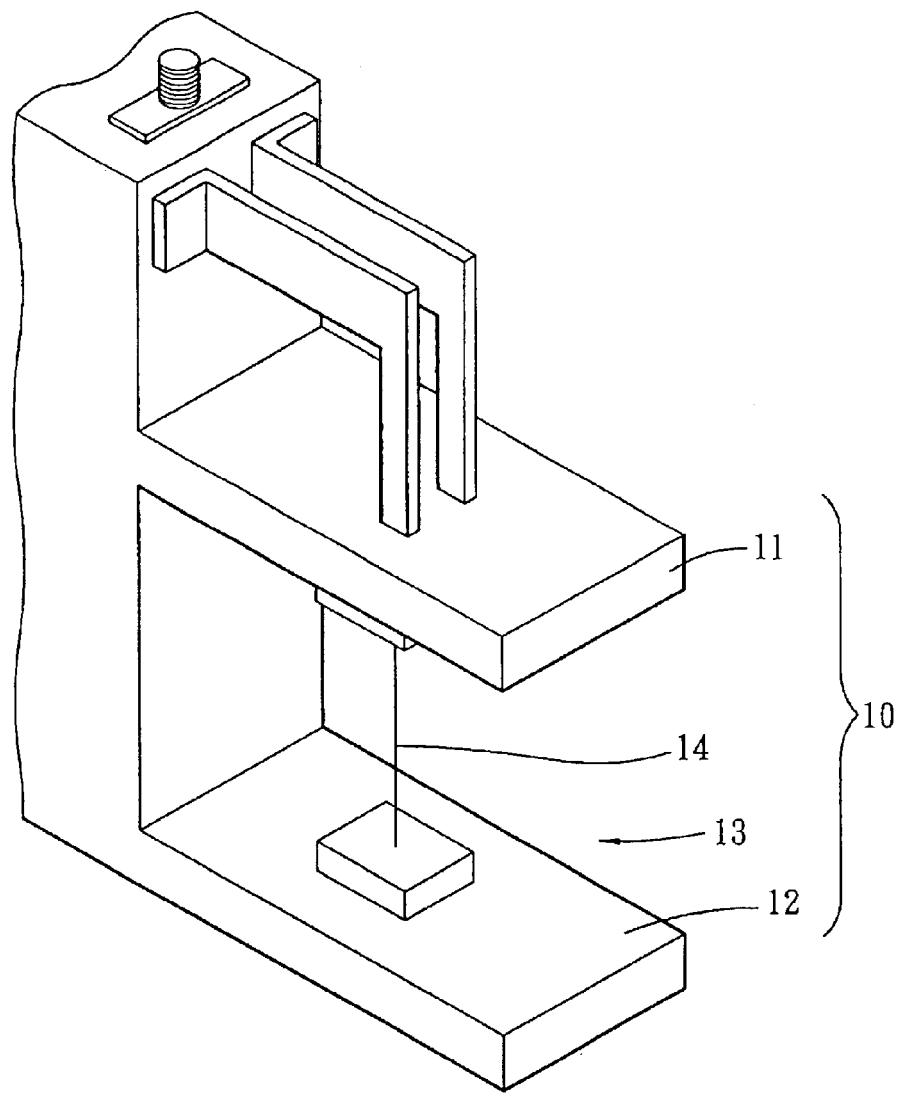
FIG. 1 is a perspective view of the simplified structure of the present invention.

Referring to FIG. 1, a wire cut electric discharge machine having rollers comprises:

a machine 10 having an upper surface and a lower surface;

a feeding portion 11 disposed on the upper surface, the feed portion 11 having a downward surface;

a receiving portion 12 disposed on the lower surface;

a working zone 13 between the feeding portion 11 and the receiving portion 12;

a wire electrode 14 being a solid cylindrical structure having a diameter labeled "d" and having two ends and an outer periphery 141.

Hence, the wire electrode 14 is constantly fed from the feed portion 11 of the machine 10 and then cuts a workpiece (not shown) in the working zone 13 by the electric discharge method. Finally, the wire electrode 14 will enter the receiving portion 12.

Figure 2:
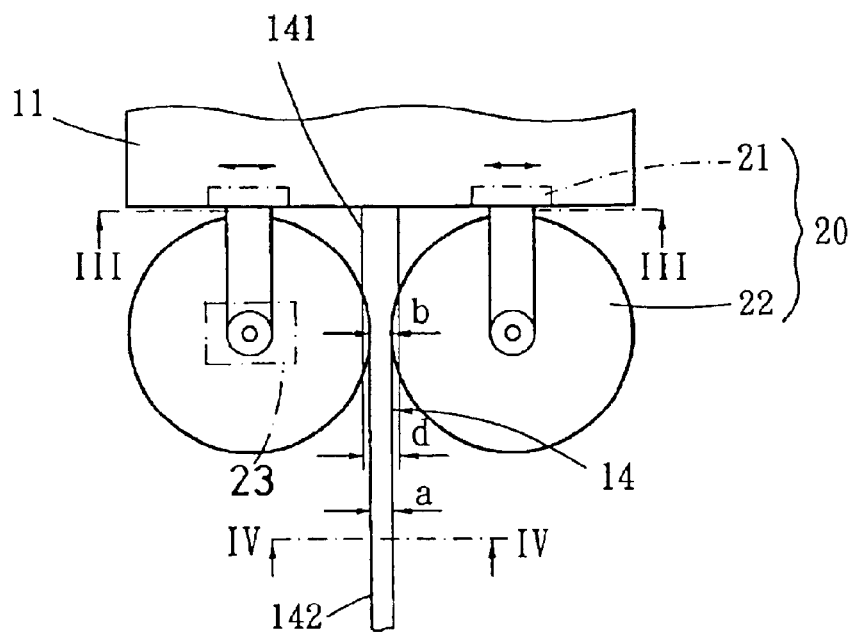
FIG. 2 is an enlarged view of a selected portion of the present invention.
Figure 3:
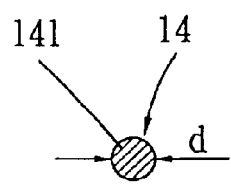
FIG. 3 illustrates the cross-sectional shape of the wire electrode before rolling.
Figure 4:
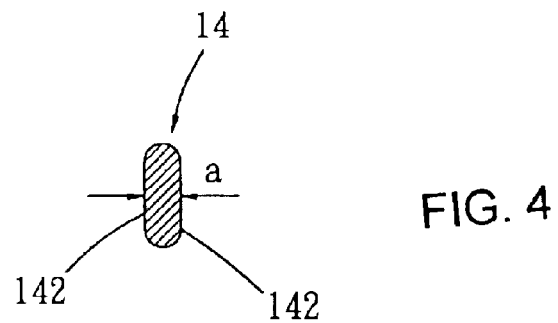
FIG. 4 illustrates the cross-sectional shape of the wire electrode after rolling.
Figure 6:
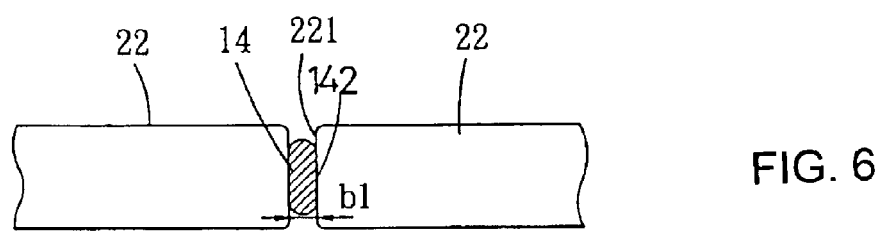
FIG. 6 shows an adjusting condition of the rolling device.

As shown from FIGS. 2 to 4, the present invention also comprises a rolling device 20 that is mounted beneath the lower surface of the machine 10. The rolling device 20 has:

(a) an adjusting seat 21 pivoted on said lower surface of said machine 10 and can be adjusted; and (b) a pair of rollers 22, the rollers 22 being spaced by an adjustable working distance; each roller 22 has an outer smooth surface 221 (as shown in FIG. 6). There is a working gap labeled "b" (as shown in FIG. 2) between two outer edges of the rollers 22.

So, the wire electrode 14 moves downward and is rolled by the outer smooth surfaces 221 of the rollers 22 from a solid cylindrical structure having a diameter labeled "d" into a thin piece-like structure having two substantially parallel rolled flat surfaces 142. Also, a working width labeled "a" between these two parallel rolled flat surfaces 142 is smaller than the diameter labeled "d" (before rolling).

Of course, in this embodiment, it can further comprise an independent driving device 23 (such as a motor or motors) for driving one or two rollers 22. Therefore, the rollers 22 have a better rolling and feeding effects.

Figure 5:
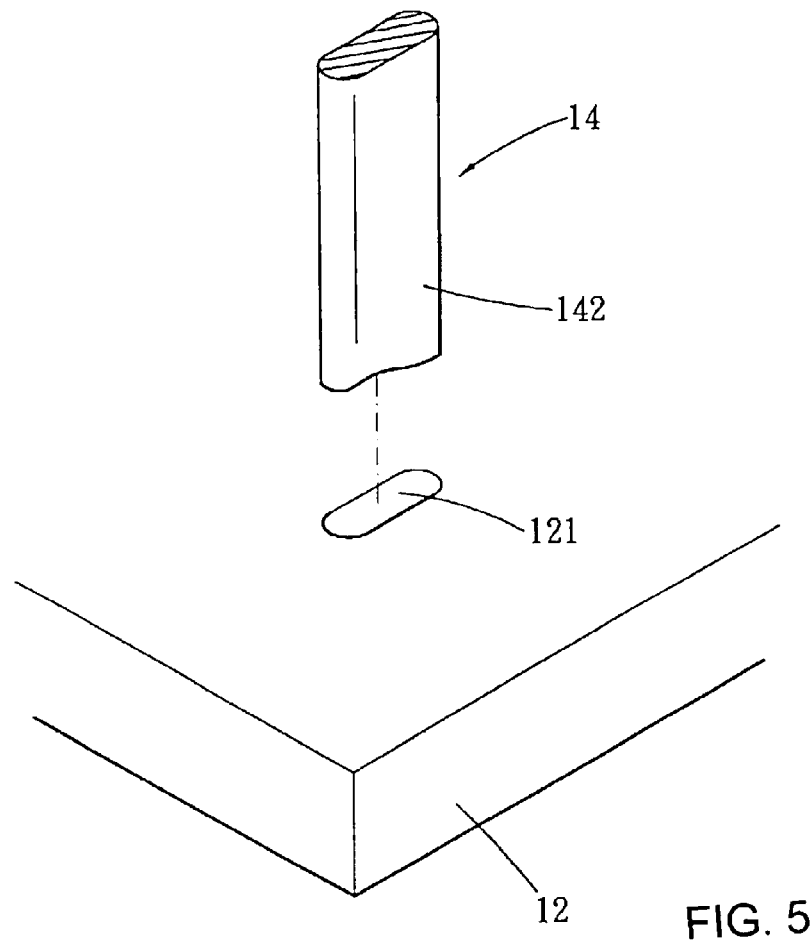
FIG. 5 is another enlarged view of a selected portion of the present invention.

Referring to FIG. 5, the receiving portion 12 has an elongated hole 121 that is corresponding to the parallel rolled flat surfaces 142 of the wire electrode 14. Thus, the wire electrode 14 can pass through the elongated holes 121 and to be stored.

With regard to this wire cut electric discharge machine having rollers, its operation can be described as follows.

First, turn on this machine. The wire electrode is fed from the feeding portion 11 and then is rolled by the rolling device 20.

Then, the wire electrode 14 is rolled and driven by the rollers 22 of this rolling device 20. Therefore, the wire electrodes deforms from a solid cylindrical structure into a thin piece-like structure having two substantially parallel rolled flat surfaces 142. In which, the working width labeled "a" between these two parallel rolled flat surfaces 142 is smaller than the diameter label "d" (before rolling);

After rolling, this thin wire electrode 14 can be used to cut a narrower and more precise slot on a workpiece.

However, under the condition that the cross-sectional area of the wire electrode 14 remains unchanged, the wire electrode 14 becomes thinner so that its minimum cutting width is narrower than before. For example, if using a cheaper cupper made wire electrode 14, the current smallest size is 50 $\mu$m (diameter) due to the limitation of required tensile strength, melting point and so on.

But, after the 50- $\mu$m wire electrode 14 (its minimum cutting width is 50- $\mu$m or more) is rolled by the rolling device 20, the wire electrode 14 will be deformed into a thin structure having two parallel rolled flat surfaces 142. Of course, its working width labeled "a" between these two parallel rolled flat surfaces 142 becomes 30$\mu$m (or less) that is smaller than the original diameter of 50 $\mu$m.

Therefore, its minimum cutting width is only approximately 30 $\mu$m. If we comparing it with the original 50 $\mu$m, it breaks the current minimum cutting width limit of copper made wire electrode.

Figure 7:
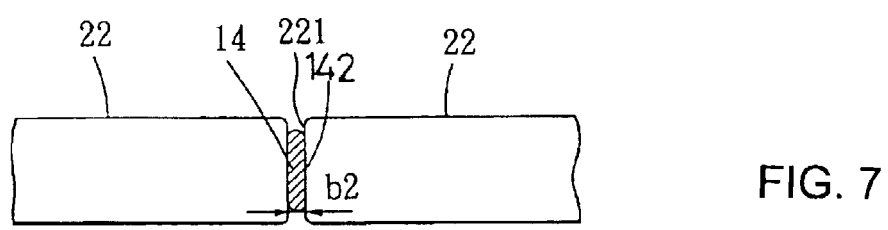
FIG. 7 shows another adjusting condition of the rolling device.
Figure 8:
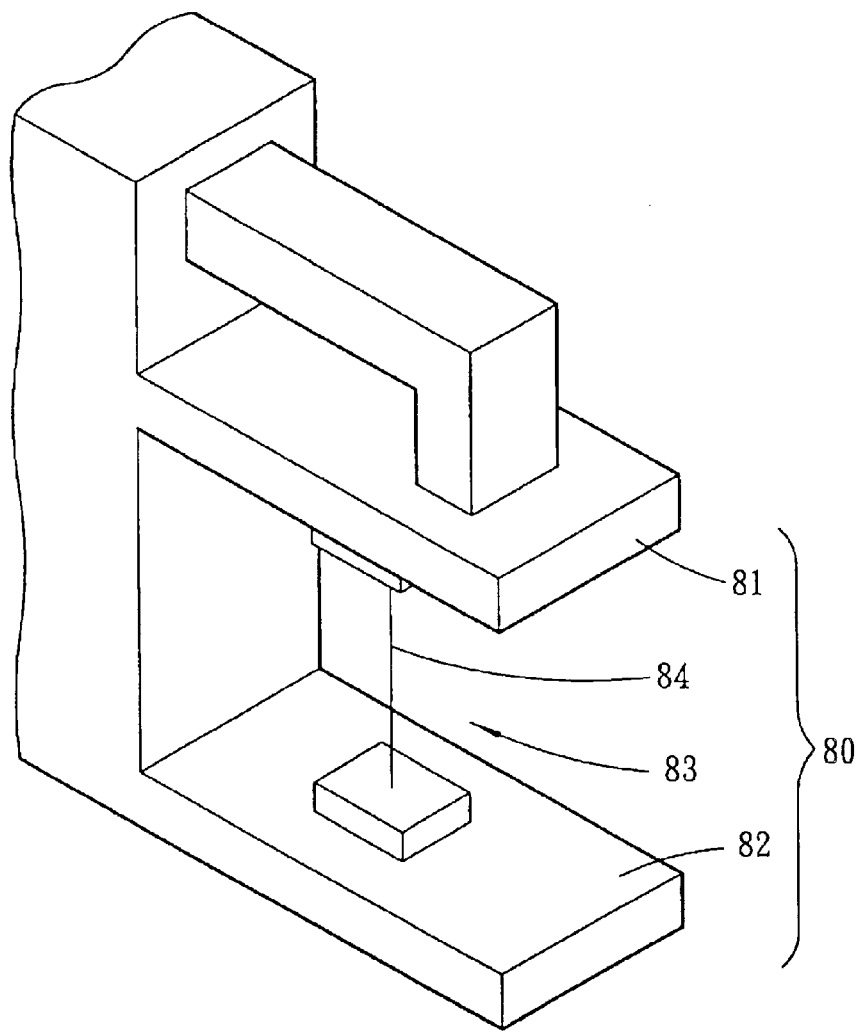
FIG. 8 is simplified structure of the traditional wire cut electric discharge machine.
Figure 9:
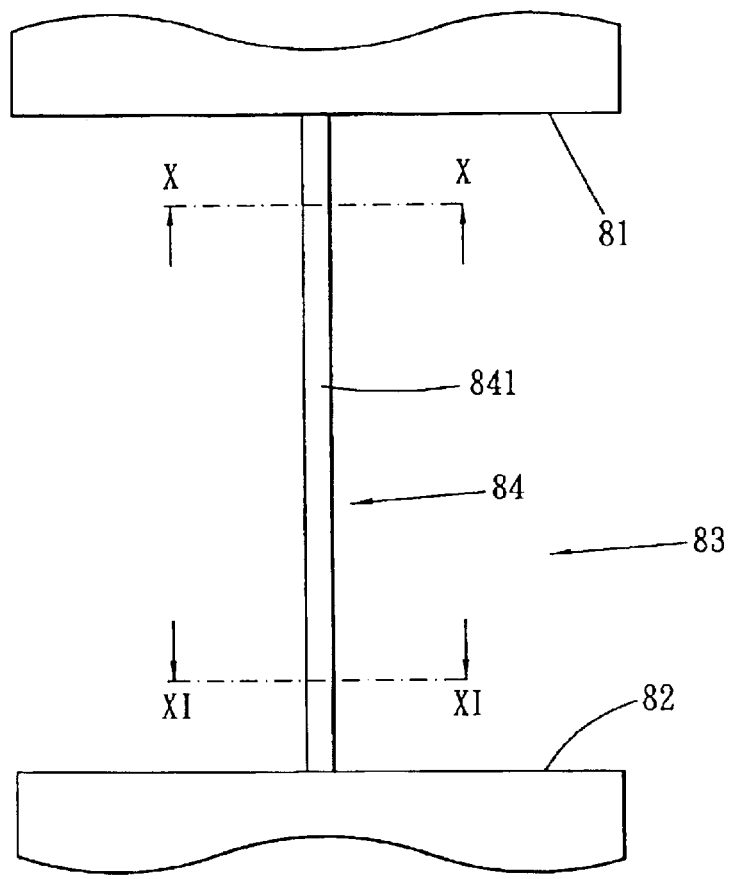
FIG. 9 is front view of the traditional wire electrode.
Figure 10:
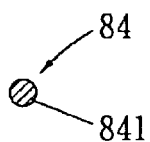
FIG. 10 illustrates the cross-sectional shape of the traditional wire electrode before cutting a workpiece.
Figure 11:
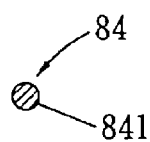
FIG. 11 illustrates the cross-sectional shape of the traditional wire electrode after cutting a workpiece.

Referring to FIGS. 6 and 7, under the required material tensile strength limit, the working gap labeled "b" between these two rollers 22 of the rolling device 20 can be adjusted into a smaller working gap label "b1" or even into another even smaller working gap labeled "b2". It depends on the actual need of the user. By doing so, the cutting width of the wire electrode 14 can be minimized to a narrower one. Thus, the cutting precision of the electric discharge machine is better than before.

Of course, if the user uses a more expensive tungsten made wire electrode 14, the current smallest size is 30 $\mu$m. By using the same rolling method mentioned above, it can be rolled into a thinner one having a smaller working distance labeled "b" than before. Therefore, the minimum cutting width of the wire electrode 14 can be reduced to a width smaller than 30 $\mu$m (or less). So, it is a significant breakthrough in this field.

The advantages and functions of the present invention can be summarized as follows:

[1] It can reduce the cutting width limit. By the rolling method of the present invention, the working width between these two parallel rolled flat surfaces is smaller the diameter of the solid cylindrical one before rolled. Thus, a smaller cutting width (especially smaller than 30 $\mu$m) is possible.

[2] It can improve the precision of product. For the microstructure product, the precision requirement is very high. The present invention can raise the precision of the workpiece by a thinner wire cutting width during the electric discharge procedure.

[3] It will not change the material property of the wire electrode. The total area of the cross-sectional area of the wire electrode remains unchanged although it has deformed. In addition, the material property (such as tensile strength limit, melting point, etc.) of the wire electrode remains unchanged.

[4] It can reduce the cost of the wire electrode. In the past, if the user need a 30 $\mu$m wire electrode. The only choice is the expensive tungsten made wide electrode. Now, by using the present invention, a cheaper copper made wire electrode becomes possible to have a cutting width of 30 $\mu$m (or less) that is rolled from its original diameter of 50 $\mu$m. Thus, the cost of the wire electrode is significantly reduced, especially for mass production.

The above embodiments are only used to illustrate the present invention, not intended to limit the scope thereof. Many modifications of the above embodiments can be made without departing from the spirit of the present invention.

What is claimed is:

1. A wire cut electric discharge machine having rollers comprising:

a machine having an upper surface and a lower surface;

a feeding portion disposed on said upper surface, said feeding portion having a downward surface;

a receiving portion disposed on said lower surface;

a working zone between said feeding portion and said receiving portion;

a wire electrode having two ends and an outer periphery;

a rolling device mounted beneath said lower surface of said machine, said rolling device having a pair of rollers and an adjusting seat for adjusting a working gap between the two rollers pivoted on said lower surface of said machine, the rollers being spaced by an adjustable working distance;

said feeding wire electrode being rolled by said rollers from a cylindrical structure having a diameter into a thin piece-like structure having two substantially parallel surfaces, a working width between said two parallel surfaces being smaller than said diameter.

* * * * *